United States Patent [19]

Tanifuji et al.

[11] Patent Number: 5,691,398

[45] Date of Patent: Nov. 25, 1997

[54] POLYLACTIC ACID COMPOSITION

[75] Inventors: Yoichi Tanifuji; Yuji Tokushige, both of Ibaraki-ken, Japan

[73] Assignee: Shin-Etsu Chemical Co., Ltd., Tokyo, Japan

[21] Appl. No.: 545,267

[22] Filed: Oct. 19, 1995

Related U.S. Application Data

[63] Continuation-in-part of Ser. No. 484,476, Jun. 7, 1995.

[51] Int. Cl.⁶ .............................. C08K 5/54; C08K 5/11; C08L 67/04
[52] U.S. Cl. .................. 523/124; 524/261; 524/267; 524/314; 524/599
[58] Field of Search ....................... 523/124, 125; 524/261, 262, 263, 264, 265, 266, 267, 268, 269, 314, 599; 525/415, 450

[56] References Cited

U.S. PATENT DOCUMENTS 5,194,473  3/1993  Shinoda et al. ............... 524/263
5,444,113  8/1995  Sinclair et al. ............... 523/124

*Primary Examiner*—Peter A. Szekely
*Attorney, Agent, or Firm*—McAulay Fisher Nissen Goldberg & Kiel, LLP

[57] ABSTRACT

A composition comprising polylactic acid and 0.05 to 5 parts by weight of silicone oil per 100 parts by weight polylactic acid, having improved mechanical properties.

2 Claims, No Drawings

POLYLACTIC ACID COMPOSITION

This application is a continuation-in-part of application Ser. No. 08/484,476, filed June 7, 1995, the contents of which are incorporated herein by reference.

FIELD OF THE INVENTION

This invention pertains to a type of biodegradable thermoplastic resin. More specifically, this invention pertains to a type of polylactic acid composition with significantly improved mold-release properties, elongation at break, impact strength and tensile strength.

BACKGROUND OF THE INVENTION

Conventionally, polyethylene, polypropylene, polystyrene, polyethylene terephthalate, polyvinyl chloride and other thermoplastic resins are widely used in manufacturing packaging materials, detergent containers, cosmetics containers, food containers and other packaging applications.

After use, these products are disposed of from homes and plants. Ultimately they are buried as trash in landfills.

In recent years, the amount of these packaging thermoplastic resins has increased significantly. As a result, the amount of waste plastics disposed from homes and plants has increased rapidly. On the other hand, the landfill capacity in the suburbs of metropolitan areas has become insufficient. Also, when these packaging thermoplastic resins are discarded as wastes into the environment, as they are chemically stable, they remain undergraded. Consequently, the view is degraded, and the living environment and the living conditions of marine organisms are polluted. These problems have become serious social problems.

In order to solve these problems, the biodegradable polymers have become attractive in recent years. In particular, polylactic acid has been proposed as a biodegradable polymer. This type of polylactic acid can be 100% biodegraded in a few months inside animals. When it is in soil or seawater, it degrades in the wet environment in a few weeks, and it disappears after about 1 year. The products of biodegradation of polylactic acid include lactic acid, water and carbon dioxide, which are all harmless compounds. Consequently, polylactic acid may make a significant contribution in solving environmental problems in the future.

The moldings prepared from polylactic acid have good transparency, and their mechanical properties are better than those of the other biodegradable polymers.

However, during processing, polylactic acid usually has inferior mold-release properties, elongation at break, impact strength and tensile strength (yield strength, rupture strength).

SUMMARY OF THE INVENTION

The purpose of this invention is to provide a type of polylactic acid composition with significantly improved impact strength, elongation at break and mold-release properties.

In order to achieve the aforementioned purpose, the present inventors have carried out extensive research. As a result of this research work, this invention was realized.

That is, this invention provides a type of polylactic acid composition, characterized by the fact that by adding 0.05–5 parts by weight of silicone oil into 100 parts by weight of polylactic acid, it is possible to form a polylactic acid composition with improved impact strength, elongation at break, mold-release properties and tensile strength.

DETAILED DESCRIPTION OF THE INVENTION

The polylactic acid may be prepared by the dehydration polycondensation of L-lactic acid, D-lactic acid or their mixture, in a well known manner.

It is preferred that a lactide, a cyclic dimer of lactic acid, be subjected to cleavage polymerization to form the polylactic acid.

The types of lactide include L-lactide, a cyclic dimer of L-lactic acid, D-lactide, a cyclic dimer of D-lactic acid, and meso-lactide, a cyclic dimer of D-lactic acid and L-lactic acid.

There is no special limitation on the molecular weight of the polylactic acid used in this invention. The weight average molecular weight of the polylactic acid is preferably in the range of 100,000 to 300,000. If the weight average molecular weight is smaller than the aforementioned range, the mechanical strength (tensile strength, impact strength) is low. On the other hand, if the molecular weight is larger than the aforementioned range, the melt viscosity in the molding operation is too high to carry out the processing.

Examples of the silicone oils that can be used in this invention include dimethylsilicone oil, methylphenylsilicone oil, methylhydrodienesilicone oil, alkyl-modified silicone oil, metaphosphoric-acid-modified silicone oil, methylstyryl-modified silicone oil, polyether-modified silicone oil, higher-fatty-acid modified silicone oil, higher-fatty-acid-containing silicone oil, higher-fatty-acid-ester-modified silicone oil, hydrophilic specially-modified silicone oil, higher-alkoxy-modified silicone oil, fluorine-modified silicone oil, etc.

They may be used either alone or as a mixture of two or more types.

Among the aforementioned silicone oils, alkyl-modified silicone oil, methylstyryl-modified silicone oil are preferred.

For these types of silicone oils, the intrinsic viscosity at 25° C. should be in the range of 100–10,000 cs.

As far as the amount of the silicone oil added is concerned, with respect to 100 parts by weight of polylactic acid, the amount of silicone oil should be in the range of 0.05–5 parts by weight, or preferably in the range of 1–5 parts by weight. If the amount of silicone oil added is less than 0.05 part by weight, the degree of improvement of the impact strength, elongation at break and mold-release properties is insufficient. On the other hand, if the amount is larger than 5 parts by weight, there is no further improvement in the effect, yet the cost is boosted. This is undesirable.

On the other hand, examples of the plasticizers that can be used include: lactic acid oligomer, lactide;

di-2-ethylhexyl phthalate (DOP), dibutyl phthalate (DBP), diisodecyl phthalate (DIDP) and other phthalate esters;

di-2-ethylhexyl adipate (DOA), diisodecyl adipate (DIDA) and other adipate esters;

di-2-ethylhexyl azelate (DOZ) and other azelate esters;

dibutyl sebacate (DBS), di-2-ethylhexyl sebacate (DOS) and other sebacate esters;

epoxidized soybean oil, epoxidized linseed oil and other epoxidized plasticizers;

triphenyl phosphate (TPP), tricresyl phosphate (TCP) and other phosphate esters;

tri-2-ethylhexyl acetylcitrate, tributyl acetylcitrate, tributyl citrate and other polyhydric hydroxycarboxylic esters;

polypropylene glycol adipate ester, polypropylene glycol sebacate ester, and other polyester-based plasticizers;

diethylene glycol dibenzoate, pentaerythritol esters, and other glycol esters;

glycolic acid, its oligomer, glycolite, etc.

They may be used either alone or as a mixture of two or more types. Di-2-ethylhexyl azelate is the most preferred choice.

As far as the amount of the plasticizer used is concerned, with respect to 100 parts by weight, it should be an amount that is effective to achieve the desired effect without adversely effecting the desired properties of the composition. The amount of the plasticizer should be in the range of 5–30 parts by weight. If the amount is less than 5 parts by weight, the impact strength is low. On the other hand, if the amount is over 30 parts by weight, the tensile strength (yield strength) decreases. This is also undesirable.

The polylactic acid composition prepared in this invention can be used effectively in manufacturing packaging materials such as shrink film, detergent containers, cosmetics containers, fast-food containers, fishing wires, fishing nets, fibers, etc.

In the following, this invention will be explained in more detail with reference to application examples and comparative examples.

APPLICATION EXAMPLES AND COMPARATIVE EXAMPLES

The compositions listed in Table I were prepared from the components listed in Table I.

Each of the obtained compositions was blended in a 6-in roll at 150° C. for 15 min, followed by molding to form a sheet with a thickness in the range of 4–5 mm.

The obtained molding sheet was cut. By using a press molder, plate-shaped sample sheets (with thickness of 1 mm and 3 mm) for analysis of the mechanical properties were formed at 160° C. and under 50 kgf/cm² for 10 min. The obtained plate-shaped sample sheets were used to carry out the following tests of properties, with results listed in Table I.

Tensile strength test

From the aforementioned plate-shaped sample sheets, tensile strength test specimens were prepared, and the tensile strength test was carried out according to JIS K-7113.

Izod impact test

From the aforementioned plate-shaped sample sheets, impact strength test specimens were prepared, and the impact strength test was carried out according to JIS K-7110.

TABLE I

| | APPLICATION EXAMPLE 1 | APPLICATION EXAMPLE 2 | COMPARATIVE EXAMPLE 1 |
|---|---|---|---|
| Polylactic acid (parts by weight) | 100 | 100 | 100 |
| Di-2-ethylhexyl azelate (parts by weight) | 10 | 10 | 10 |
| Silicone oil KF-412 | 2 | 0 | 0 |
| Silicone oil KF-410 | 0 | 2 | 0 |
| Elongation at break (%) | 86.4 | 92.5 | 74.4 |
| Yield strength (kgf/mm²) | 5.16 | 6.24 | 3.08 |
| Rupture strength (kgf/mm²) | 4.82 | 5.18 | 2.21 |
| Izod impact strength (kgf cm/cm²) | 9.8 | 10.2 | 4.7 |

Polylactic acid: Molecular weight of 170,000.
KF-412: Alkyl-modified silicone oil, manufactured by Shin-Etsu Chemical Co., Ltd., with a viscosity at 25° C. of 500 cs.
KF-410: Methylstyryl-modified silicone oil, manufactured by Shin-Etsu Chemical Co., Ltd., with a viscosity at 25° C. of 1,000 cs.

We claim:

1. A composition comprising 100 parts by weight of polylactic acid and 0.05 to 5 parts by weight of silicone oil and 5 to 30 parts by weight of plasticizer, said silicone oil being selected from the group consisting of alkyl-modified silicone oil and methylstyryl-modified silicone oil, said silicone oil having an intrinsic viscosity at 25° C. of 100 to 10,000 cs.

2. The composition according to claim 1 wherein said plasticizer is di-2-ethylhexyl azelate.

* * * * *